June 4, 1946.  C. L. EKSERGIAN  2,401,628
VEHICLE DRIVING MECHANISM
Filed Oct. 30, 1943
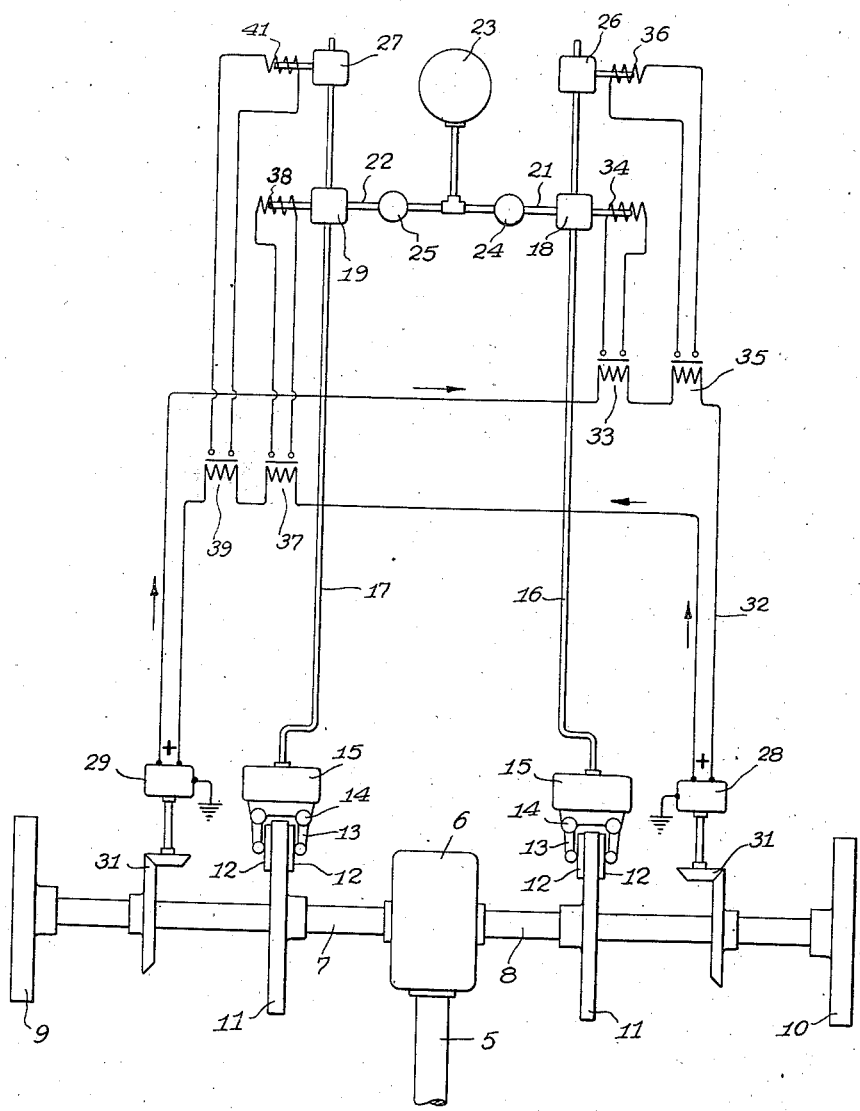
INVENTOR.
Carolus L. Eksergian
BY
ATTORNEY Patented June 4, 1946

2,401,628

UNITED STATES PATENT OFFICE 2,401,628

VEHICLE DRIVING MECHANISM

Carolus L. Eksergian, Detroit, Mich., assignor to Budd Wheel Company, Philadelphia, Pa., a corporation of Pennsylvania Application October 30, 1943, Serial No. 508,362

5 Claims. (Cl. 180—9.2)

This invention relates to vehicle driving mechanisms and particularly to those of the track laying or endless tread type, in which steering of the vehicle is accomplished by varying the speeds of the tracks on the opposite sides of the vehicle.

An object of this invention is to provide an improved driving mechanism for vehicles of this type constructed and arranged to produce a smooth and continuous braking operation when required, and to automatically prevent "oversteering," that is, turning too quickly at high speeds.

These and other objects which will be apparent are accomplished by the invention hereinafter described and illustrated in the accompanying drawing which shows a diagrammatic layout of a vehicle driving mechanism constructed in accordance with one embodiment of this invention.

As illustrated, the invention is shown in connection with a driving mechanism for tanks, tractors, or other vehicles of the track laying type in which a power shaft 5 driven from any suitable source of power (not shown), operates through a differential 6 of conventional form to drive the plural driving means of the vehicle through countershafts 7 and 8 which are connected to and drive, respectively, rotary members 9 and 10 which in turn actuate the tracks on each side of the vehicle. Each countershaft has a braking mechanism for independently controlling its speed of operation.

Each mechanism includes a brake disc 11 connected to the associated shaft and brake shoes 12 mounted on operating yokes 13 supported on pivots 14 and actuated by fluid pressure motor means 15 to produce braking engagement of the shoes 12 with the associated disc 11, upon delivery of fluid pressure to the cylinder 15. The two brake operating cylinders are connected by fluid pressure lines 16 and 17, respectively, through pressure controlling valves 18 and 19, and lines 21 and 22 to a source 23 of fluid pressure. The delivery of fluid pressure from the source 23 to the connecting lines is controlled by separate manually operated valves 24 and 25. The supply lines 16 and 17 have dump valves 26 and 27 connected thereto for selectively reducing the braking pressure in the lines 16 and 17 when desired.

Each driving mechanism operates a separate motor generator 28 and 29 through gearing 31, or the like, driven from the separate countershafts 7 and 8, and an electric circuit 32 connects the two generators. Included in the electric circuit is a relay 33 responsive to current flow from generator 28 to generator 29 for operating a solenoid 34 to actuate the valve 18 to shut off the pressure line 21 when a certain predetermined potential is established by the generator 28 due to excess speed thereof over generator 29. A second relay 35, which is responsive to current flow from generator 28 to generator 29, controls a solenoid 36 for operating the pressure dump valve 26 in the line 16. A relay 37, responsive to current flow from generator 29 to generator 28, controls the solenoid 38 to operate the pressure valve 19 to shut off the pressure line 22 on the other side of the tractor when the predetermined potential is established by the generator 29 due to excess speed thereof over generator 28. A relay 39, responsive to current flow from generator 29 to generator 28, operates a solenoid 41 for operating the dump valve 27 controlling the line 17. Each of the four relays is a directional relay of conventional form, such as the polarized pole type, the arrows indicating the direction of polarization, and is operated only upon current flow in a certain direction in the circuit 32. Relays 33 and 35 are operated only upon current flow through the outer branch of the circuit 32 from generator 28 to generator 29 and thence to ground while relays 37 and 39 are operated only upon current flow in the opposite direction.

In operation, the relays 33 and 37 are set to operate on a voltage difference between the two generators of five volts, for example, while relays 35 and 39 are set to operate on a potential of 6 volts, for example.

In operation, assuming it is desired to turn the vehicle while under way, the brake on that side will be applied for the purpose of slowing up the speed of the track on that side. Assuming the turn is to the right, the valve 24 is operated to apply the braking mechanism on the countershaft 8 so as to reduce the speed of the driving mechanism 10. This reduces the speed of operation of the generator 28 and results in the generator 29 establishing a higher potential in the circuit 32. Should too great a braking pressure be applied, the potential established by generator 29 will reach 5 volts which is sufficient to actuate the relay 33, in turn operating the valve 18 through the solenoid 34 so as to shut off the pressure line 21 and prevent the application of further pressure to the associated braking mechanism.

If the differential in speed is such as to bring the voltage up to 6 volts, for example, the dump relay 35 will be actuated to operate solenoid 36 and dump valve 26 for the purpose of reducing braking pressure in the pressure line 16 and relieve the braking mechanism on the shaft 8 of a part of the braking pressure. Ordinarily the valve 26 will operate to bleed the fluid in the associated brake cylinder rather than dump the entire pressure.

Operation of the relays 37 and 39 is similar and is produced when the speed of the driving mechanism 9 is sufficiently less than that of mechanism 10 to cause the generator 29 to establish the necessary potential in the electric circuit 32, for example, 5 and 6 volts, respectively.

It will be apparent that operation of the present invention is prevented when both brakes are applied together, unless they are applied with such a differential in pressure as to produce turning beyond the degree for which the system is set. Also, the relays are of such type that they will not be effective at vehicle speeds of less than a predetermined amount, such for example, as five miles per hour.

What is claimed is:

1. In a steering control for vehicles, differentially-driven driving means at the opposite sides of the vehicle, operator-controlled means for differentially braking said driving means and thereby causing the same to be operated at differential speeds at the opposite sides of the vehicle to effect steering of the vehicle, and means responsive to a predetermined differential in the speeds of said driving means for modifying the action of the manually-controlled means to prevent oversteering thereby.

2. In a steering control for vehicles, differentially-driven driving means at the opposite sides of the vehicle, operator-controlled means for differentially braking said driving means and thereby causing the same to be operated at different speeds at the opposite sides of the vehicle to effect steering of the vehicle, means responsive to a predetermined differential in the speeds of said driving means for limiting the braking action on the driving means operating at the slower speed due to the operator-controlled differential braking and further means responsive to predetermined higher differential in the speeds of the driving means for reducing the braking action on said driving means operating at the slower speed.

3. In a steering control for vehicles, separate driving means at the opposite sides of the vehicle, a differential drive therefor, a separate operator-controlled braking means for each of said driving means including a fluid pressure device, said separate braking means for permitting, at the will of the operator, differential braking of the driving means on the opposite sides of the vehicle to cause them to operate at different relative speeds to effect steering of the vehicle, and means responsive to a predetermined difference in the relative speeds of said driving means for limiting the operator-controlled pressure of the braking means associated with the driving means operating at the slower speed due to differential operation of said braking means.

4. In a steering control for vehicles, driving means on the opposite sides of the vehicle, a differential drive therefor, a separate operator-controlled braking means for each of said driving means including a fluid pressure device, said separate braking means permitting, at the will of the operator, differential braking of the driving means on the opposite sides of the vehicle to cause them to operate at different relative speeds to effect steering of the vehicle, and electrically-controlled means responsive to a predetermined difference in the relative speeds of said driving means for limiting the pressure of the braking means associated with the driving means operating at the slower speed due to differential operation of said braking means.

5. In a steering control for vehicles, separate driving means at the opposite sides of the vehicle, a differential drive therefor, a separate operator-controlled fluid-operated braking mechanism for each of said driving means, said separate mechanisms permitting, at the will of the operator, differential braking of the driving means at the opposite sides of the vehicle to cause them to operate at different relative speeds to effect steering of the vehicle, a separate electric current generator operated by each of said driving means, an electric circuit connecting said separate generators so that the potential established by one opposes that established by the other, separate shut-off and pressure reducing valves connected in each brake mechanism independent of the operator's control thereof, separate shut-off valve-controlling relays responsive to a predetermined potential difference between said generators for limiting the braking pressure applied by the operator to the driving means operating at the slower speed due to the differential operation of said braking mechanisms, and separate reducing valve-controlling relays responsive to a predetermined higher potential difference between said generators for reducing the braking pressure applied to said driving means operating at the slower speed.

CAROLUS L. EKSERGIAN.